United States Patent [19]

Kiraly

[11] 4,108,046
[45] Aug. 22, 1978

[54] LIQUID-GAS CONSTANT FORCE RECOIL SPRING

[75] Inventor: Louis J. Kiraly, Brook Park, Ohio

[73] Assignee: The United States of America as represented by the Secretary of the Navy, Washington, D.C.

[21] Appl. No.: 584,666

[22] Filed: Jun. 6, 1975

[51] Int. Cl.$^2$ ............................ F16F 5/00; F16F 9/08
[52] U.S. Cl. .................................. 89/43 A; 188/269; 188/298; 267/64 A; 267/121
[58] Field of Search ................ 267/64 R, 64 A, 64 B, 267/113, 118, 121, 122, 126, 151; 89/43 R, 43 A; 188/269, 298; 248/358 R

[56] References Cited

U.S. PATENT DOCUMENTS

| | | | |
|---|---|---|---|
| 2,392,387 | 1/1946 | Joy | 267/121 |
| 2,560,005 | 7/1951 | Shawbrook et al. | 267/64 A |
| 2,914,089 | 11/1959 | Allinquant | 267/121 |
| 2,973,694 | 3/1961 | Herlach et al. | 267/64 A X |
| 3,034,803 | 5/1962 | Doulgheridis | 267/64 R X |
| 3,304,077 | 2/1967 | Eaton et al. | 267/64 B |
| 3,484,092 | 12/1969 | Scarpatetti | 267/64 R |

*Primary Examiner*—Johnny D. Cherry
*Attorney, Agent, or Firm*—R. Sciascia; R. Beers; S. Sheinbein

[57] ABSTRACT

A constant-force spring of the liquid-gas type comprising a piston slidable in a cylinder and an elastomeric bladder enclosed in the cylinder. The bladder is filled with a gas, preferably nitrogen. The rest of the cylinder is filled with a compressible liquid having a low bulk modulus. A liquid that can be used is dimethyl silicone which has a bulk modulus of only 150,000 psi. The low bulk modulus gives a low spring constant which is necessary if a constant force characteristic is to be achieved.

3 Claims, 2 Drawing Figures

LIQUID-GAS CONSTANT FORCE RECOIL SPRING

BACKGROUND OF THE INVENTION

This invention relates to constant-force springs and especially to constant-force springs of the liquid-gas type.

Constant force springs may be used in gun recoil systems. The basic functions of any gun recoil system is to provide a means of:

a. Absorbing or converting the energy imparted to the recoiling mass by the fired ammunition, which is necessary in order to minimize loads within the supporting structure.

b. Restoring the recoiling mass to a condition similar to the condition that existed before firing, in order that a next shot may be fired.

An optimal recoil system would best satisfy the above objectives without compromising the constraints of low total weight, short cycle time, and reproducibility.

First of all, an optimal recoil system would store recoil energy rather than absorb (or dissipate) it. This would allow all of the stored recoil energy to act in rapidly restoring the gun to the state which existed before firing; and, also eliminate design and maintenance problems associated with special energy dissipators.

However, this proposed reduction of dissipative elements within a dynamical recoil system requires a greater reproducibility of the force-displacement characteristics of the energy storage device (spring). Therefore, an optimal recoil spring would have both low dissipation and high reproducibility.

Secondly, since mechanical energy is stored by the action of a force over a distance, the most efficient manner in which to store mechanical recoil energy is to apply a constant force to the recoiling mass. A constant force allows for the fastest absorbtion and retrieval of recoil energy for both a minimum peak braking force and a minimum stroke length. Furthermore, this approach reduces the strength requirement (and weight) of the supporting structure.

In summary then, an optimal general recoil system provides for three basic qualities:

a. Energy storage by the application of a constant force.

b. Reproducible constant force from one firing cycle to the next.

c. Low energy dissipation.

One particular application of a spring to a fire-out-of-battery gun requires a constant force spring whose force can be adjusted as a function of elevation angle.

This sensitivity of the applied force to an adjustment would also provide a means of compensating for changes in a recoil spring's operating characteristics. Therefore, a fourth requirement of an optimal recoil spring becomes:

d. Rapid adjustment in the applied force with changes in elevation angle and operating characteristics.

The fire-out-of-battery approach is used to greatly reduce the required recoil brake loads. The recoiling mass is caused to move forward before a round is fired. The round is then fired during this forward motion, and the firing energy acts to cancel and reverse the momentum of the recoiling mass. In essence, recoil brake loads are applied before firing and act to store kinetic energy within the recoiling mass. Acquired momentum then acts to cancel part of the firing impulse so peak/brake loads are decreased. Proper phasing and timing require a great reproducibility throughout the firing cycle. Gravity forces on the recoiling mass would vary with elevation angle and would add bias forces that the recoil spring must counter. In order that the reproducibility requirement of the overall system be met, the recoil system must rapidly adjust to these new conditions.

The above requirements of reproducibility and constant force may be met by a fluid/piston type of spring. Constant force can be achieved by a constant pressure; reproducibility would be as precise as the precision at which the constant pressure can be maintained.

A fluid/piston spring built as an all-liquid spring could be used in a closed volume by exploiting bulk modulus (compressibility) characteristics of the liquid. Readily available servo-controlled, positive displacement pumps would provide force adjustability. The principle drawback to an all-liquid spring is that it would require a fairly large volume of fluid (and weight). This large volume of liquid would be necessary to keep the spring rate low in comparison to the bias force (e.g., an almost constant-force spring).

A gas spring, however, would provide a highly reproducible constant force in a low volume. The several special problems associated with an all-gas spring are as follows:

1. Requires more elaborate seals than liquid springs.

2. Requires a more elaborate pumping system for pressure maintenance and force adjustment.

3. Presents a greater safety hazard if the pressure container should fracture. Gaseous expansion would tend to spew metal fragments. In a liquid spring, the liquid would lose pressure rapidly without causing fragments to gain high velocity. In the liquid-gas spring the liquid volume would act to dampen gaseous expansion.

The solution to the problem of obtaining all desired characteristics at a low total weight is found in a trade-off of characteristics as found in a liquid-gas spring. This approach involves a sealed bladder of gas within a liquid medium. The liquid is pumped for adjustability within the total liquid-gas volume, while the gas provides for most of the compressibility.

The liquid-gas recoil spring satisfies the description of an optimal recoil spring device. The proposed spring combines the advantages of both the all-liquid and all-gas springs with a minimum of the disadvantages.

SUMMARY OF THE INVENTION

The objects and advantages of the invention are provided by a liquid-gas piston-type spring with a substantially constant force characteristic. The substantially constant force characteristic is the result of a low spring constant which is achieved by using a large fluid volume in a reservoir coupled to the spring cylinder and by using a liquid with a low bulk modulus.

An object of this invention is to provide a substantially constant-force spring of the liquid-gas type.

Another object is to provide a spring of the above type, which has dynamic adjustability.

A further object is to avoid the fluid-flow energy losses and heating of an orifice-type shock absorber.

Other objects, advantages and novel features of the present invention will become apparent from the following detailed description of the invention when considered in conjunction with the accompanying drawing.

DETAILED DESCRIPTION OF THE INVENTION

Figure 1:
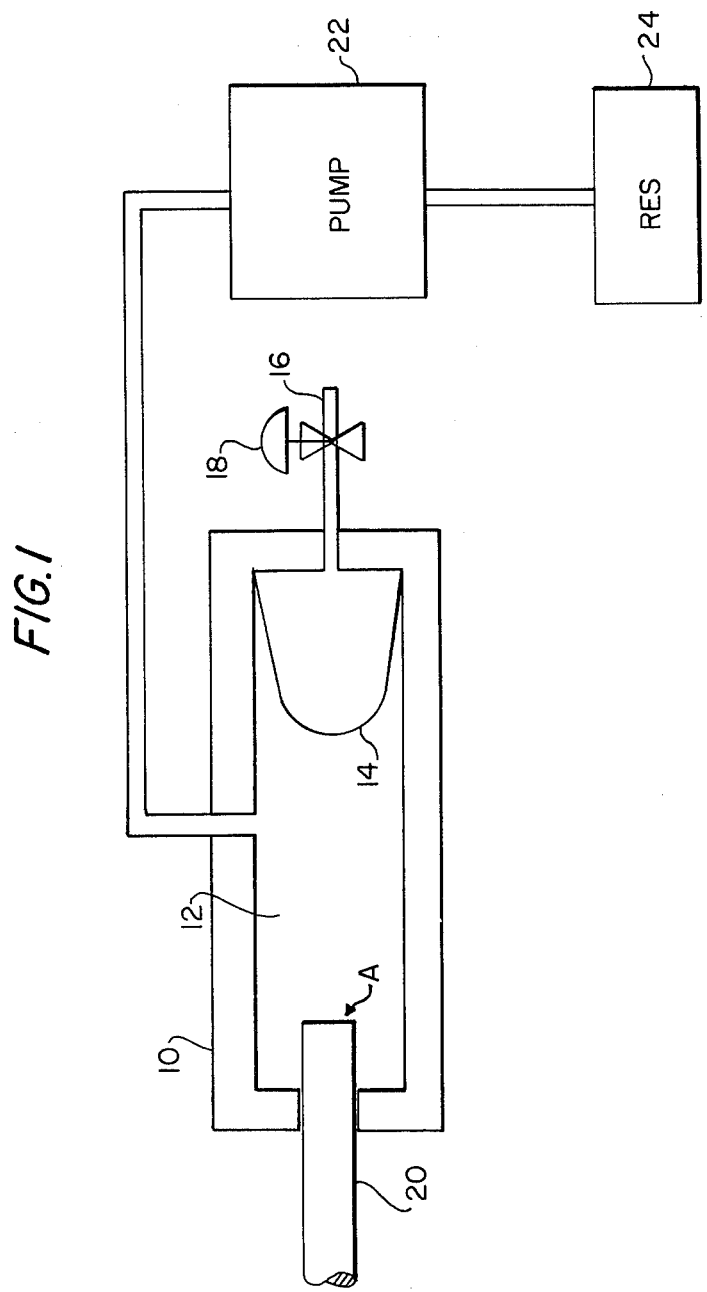
FIG. 1 is a schematic illustration of an embodiment of a liquid-gas spring and its associated components.

FIG. 1 shows the liquid-gas spring in side cross-sectional view. The piston cylinder 10 has a central space 12 which is used to contain the liquid. An elastomeric bladder 14 at one end of the cylinder 10 is coupled to a gas feed line 16 which can be opened or shut by means of a valve 18. At the other end, a piston 20 of end area A enters the liquid-housing portion of the cylinder 10. If the spring is being used in a gun system, the gun could be mechanically coupled to the piston 20 and the cylinder 10 held immobile. It is also possible to hold the piston immobile and couple the gun to the cylinder.

The gas employed may be one of the inert gases such as nitrogen, for example. The liquid used should be a liquid having a low bulk modulus, that is, a highly compressible liquid. Liquids such as dimethyl silicone or liquid pentane having bulk moduli of 150,000 and 125,000 psi, respectively, are excellent candidates.

Figure 2:
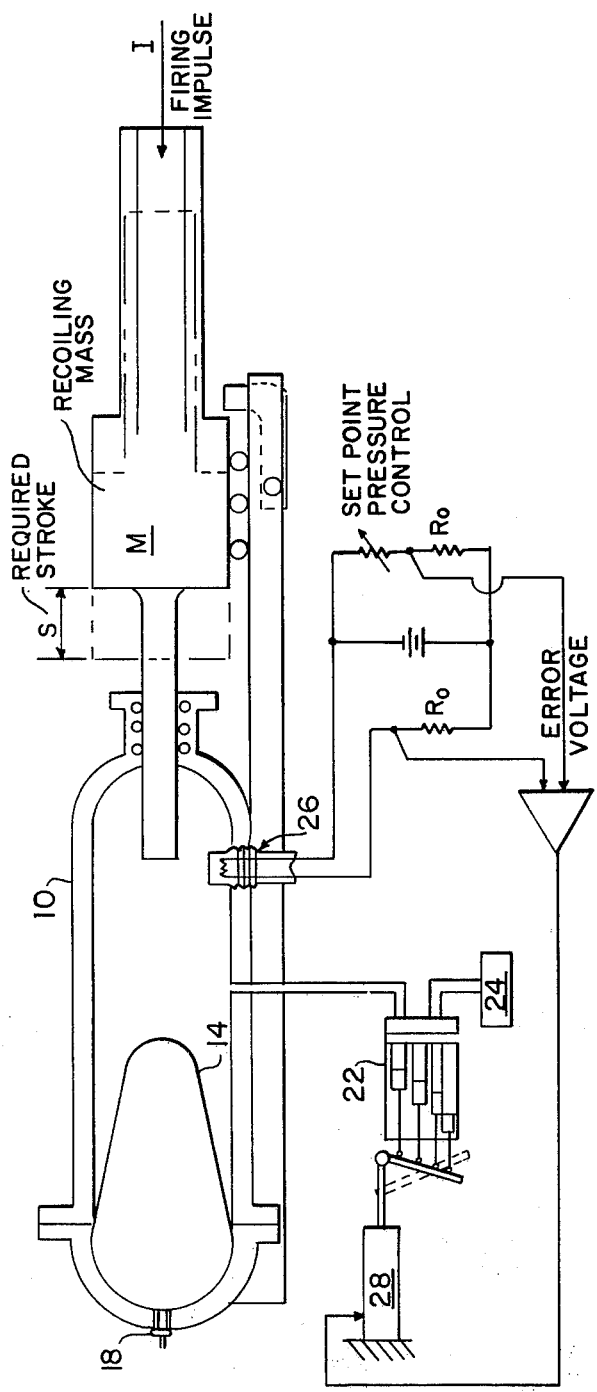
FIG. 2 is a schematic illustration of the spring in an actual gun system.

The liquid is pumped into the cylinder 10 under pressure by a pump 22 from a reservoir 24. In a practical rapid-fire gun system where the gun has to be elevated and depressed, the bias force level of the spring has to be adjusted as the elevation changes (dynamic adjustability). In such a system, the liquid pressure is sensed and the pressure is automatically adjusted to the desired level. The apparatus for doing this could comprise a pressure sensor 26 (see FIG. 2) in the liquid, a circuit for converting the output of the pressure sensor to an error voltage, and a servo actuator 28 controlling the action of the pump 22 in response to the error voltage. The pump could be a swash-plate pump, for example.

If the spring were used in a non-elevatable system where the required force level is constant and in a single action system where the liquid did not heat up, achieving a constant force would require only a liquid with a low bulk modulus so that the spring would have a low spring constant (as close to zero as possible). Other factors which help to achieve a low spring constant are a large volume in the cylinder and operation with the highest possible liquid pressure. In a system which is elevatable so that the required force level changes and in which the spring action is repeated rapidly, the volume of compressible liquid in the total working volume of the spring must be controlled. Hence, the need exists for a liquid reservoir and a pump. Dynamic adjustability of the force level is attained by the addition (or subtraction) of small amounts of liquid to (or from) the working volume of the spring.

Although the discussion herein specifies constant force, this is an ideal which is only reached when the spring constant is zero. Practically speaking, the spring provides only a substantially constant force, the variation being less than 1.0% for 6 inches and smaller strokes.

It should be noted that the spring is a low-loss spring and also that it does not use hydraulic fluid, since hydraulic fluid is typically a low-compressibility liquid. The spring endeavors to store energy and return it to the gun system as braking energy rather than to dissipate the recoil energy.

Equations and assumptions for designing a constant-force liquid-gas spring are given below:

Parameters:
$\gamma$ — ratio of specific heats of the gas
$p$ — pressure (psi)
$R_B$ — bulk modulus of the fluid (psi)
$A$ — piston area
$V_l$ — volume of the liquid (in$^3$)
$V_g$ — volume of the gas (in$^3$)
$k_s$ — spring constant (lbs/in)
$F$ — force
$X$ — piston displacement Assumptions:
1. Bulk modulus of the fluid is constant.
2. Adiabatic compression and expansion of the gas.
3. Bladder elastic forces are negligible.

Equations:
By assumption #1:

$$dp_l = \frac{-k_B}{V_l} dV_l$$

By assumption #2:

$$dp_g = \frac{-\gamma p_g}{V_g} dV_g$$

By assumption #3:

$$p_l = p_g = dp_l = dp_g$$

By geometry:

$$dV_l = -A\, dx - dV_g$$

Results:

$$k_s = \frac{dF}{dx} = \frac{\gamma p\, k_B A^2}{k_B V_g + \gamma p\, V_l} \; ; \text{spring rate}$$

$$\text{Adjustability} = \frac{dF}{dV_l} = \frac{pA}{V_g}$$

$V_{lo}$; $V_{go}$ = Volume of liquid or gas at $X = 0$
$V$ - Total volume (at displacement X)
$P_o$ - pressure at $X = 0$ $$V = V_{lo}\left[1 - \frac{P_o}{k_B}\left(\frac{P}{P_o} - 1\right)\right] + V_{go}\left(\frac{P_o}{P}\right)^{1/\gamma}$$

$$X = \frac{V_{lo} + V_{go} - V}{A}.$$

The following is a typical design procedure for a spring for a gun system:

A. Design requirements:
 1. Spring must act with constant force over stroke S and must maintain S constant over any gun firing, for any gun firing position.
 2. The spring bias force must adjust in response to changing fluid characteristics and gun elevation angle.

B. Known values:
 1. Recoil mass, M = 100 lbs.
 2. Firing impulse, I = 111.46 lb-sec.
 3. Stroke length, S = 6 in. (0.5 ft).

4. Maximum tank pressure, $p_m = 12,000$ psi.
5. Minimum cross-sectional area of piston, $A_p = 0.4$ inch$^2$
6. Compressibility of silicon oil, $k_B = 150,000$ psi.
7. Ratio of specific heats of gas (nitrogen), $\gamma = 1.4$
8. Maximum average volume flow rate through pump = 5.0 in$^3$/sec
9. Gun must elevate 90° in $\frac{1}{2}$ sec.
10. Total volume of tank including both gas and liquid, $V_T = 300$ in$^3$ to 600 in$^3$ C. Determination of Required Bias Force Level: impulse delivered to recoil mass during firing; mass initially at rest after impulse has velocity $= V_o$ $$V_o = \frac{I}{M} \qquad 1.$$

constant spring force, $F_s$, opposing rearward velocity, $V_o$, to stop mass at predetermined stroke, S (in time $t$)

$$V_o = \frac{F_s}{M} t \qquad S = \frac{1}{2} \frac{F_s}{M} t^2 \qquad 2.$$

$$F_s = \frac{I^2}{2 SM}$$

required spring bias force $$F_s = \frac{(111.46)^2}{2\,(0.5)\left(\frac{100}{32.2}\right)} = 4000 \text{ lbs}$$

D. Determination of Adjustability Requirements:
1. Gun elevation in $\frac{1}{2}$ sec.

The spring must now offset the weight of the recoiling mass in order to maintain a constant stroke, S $$\text{Adjustment} = \frac{100 \text{ lb}}{\frac{1}{2} \text{ sec}} = 200 \frac{\text{lb}}{\text{sec}}$$

2. Maximum pump output = 5.0 in$^3$/sec
Therefore the minimum volume adjustability must be $$200 \frac{\text{lb}}{\text{sec}} \times \frac{1}{5.0 \text{ in}^3/\text{sec}} = 40 \frac{\text{lb}}{\text{in}^3} \text{ (of liquid)}$$

E. Determination of minimum gas volume (in order to meet adjustability requirement)

$$\text{Adjustability} = 0\,40 \frac{\text{lb}}{\text{in}^3} = \frac{\gamma p A}{V_g} = \frac{\gamma F_s}{V_g}$$

$$V_g = \frac{\gamma F_s}{40} = \frac{(1.4)\,4000}{40} = 140 \text{ in}^3$$

F. Determination of spring rate;
1. Since a constant-force spring is the most efficient way to store and rapidly recover mechanical energy, the lowest possible spring rate is desired.

$$k_s = \text{spring rate} = \frac{\gamma k_B p A^2}{k_B V_g + \gamma p V_L} = \frac{\gamma k_B \frac{F_s^2}{p}}{k_B V_g + \gamma p V_L}$$

The liquid volume should be maximized, so we choose the 600 in$^3$ tank for the spring and $V_L$ becomes 600-$V_g$ = 600-140-460 in$^3$. Furthermore, from the above equation, the spring rate will be minimized when operating at highest possible pressure.

Maximum allowed tank pressure = 12,000 psi
Minimum allowable piston area = 0.4 in$^2$
Required operating force = pA = 4,000 lb
Choose $p = 10,000$ psi, $A = 0.4$ in$^2$ $$k_s = \frac{(1.4)(15,000)\frac{4000^2}{10,000}}{(15000)(140) + (1.4)(10000)(460)} = 12.24 \frac{\text{lb}}{\text{in}}$$

Obviously, many modifications and variations of the present invention are possible in light of the above teachings. It is therefore to be understood that, within the scope of the appended claims, the invention may be practiced otherwise than as specifically described.

What is claimed is:

1. A constant-force liquid-gas spring comprising:
a cylinder defining a first region comprising a gas-tight bladder, the interior of said bladder filled with a gas, and a second region filled with a low bulk modulus liquid in direct contact with the exterior of said bladder; and
a piston entering into said second region of said cylinder, said piston and cylinder being movable relative to each other, whereby the energy of the inward motion of said piston is stored in said spring by the compression of both said liquid and said gas;
means for introducing liquid into said cylinder including:
a pump: and
a reservoir for storing said liquid, said pump being coupled to said reservoir for pumping liquid to and from said cylinder; and
a pressure sensor located within said second region of said cylinder, said pressure sensor controlling said pump in response to the pressure existing in said second region.

2. A constant-force liquid-gas spring comprising:
a cylinder defining a first region comprising a gas-tight bladder, the interior of said bladder filled with a gas, and a second region filled with a low bulk modulus liquid in direct contact with the exterior of said bladder;
a piston entering into said second region of said cylinder, said piston and cylinder being movable relative to each other, whereby the energy of the inward motion of said piston is stored in said spring by the compression of both said liquid and said gas;
means for introducing liquid into said cylinder including:
a pump; and
a reservoir for storing said liquid, said pump being coupled to said reservoir for pumping liquid to and from said cylinder;
means for connecting said piston to a gun such that said piston moves inwardly in said cylinder as said gun recoils after firing; and
a pressure sensor located within said second region of said cylinder, said pressure sensor controlling said pump in response to pressure increases in said liquid due to increased gun elevation, and pressure decrease in said liquid due to decreased gun elevation.

3. A spring as in claim 2 wherein said pump comprises a swash-plate pump which adds liquid to said second region of said cylinder as pressure is increased, and subtracts liquid from said second region of said cylinder as pressure is decreased.

* * * * *